United States Patent [19]

Inoue et al.

[11] Patent Number: 5,766,788
[45] Date of Patent: Jun. 16, 1998

[54] ELECTRODE COMPOSITION MATERIAL FOR POLYMER ELECTROLYTE FUEL CELL AND PROCESS OF PREPARING SAME

[75] Inventors: Masahiko Inoue; Tomoyuki Tada, both of Kanagawa, Japan

[73] Assignee: Tanaka Kikinzoku Kogyo K.K., Japan

[21] Appl. No.: 604,878

[22] Filed: Feb. 22, 1996

[51] Int. Cl.$^6$ ............................................. H01M 4/90
[52] U.S. Cl. ........................... 429/42; 429/30; 429/42; 502/182
[58] Field of Search .................... 429/30, 42, 44; 502/182, 185; 252/503

[56] References Cited

U.S. PATENT DOCUMENTS

| | | | |
|---|---|---|---|
| 4,215,183 | 7/1980 | MacLeod | 429/30 |
| 4,444,505 | 4/1984 | Blanchart | 429/44 X |
| 4,615,954 | 10/1986 | Solomon et al. | 429/44 X |
| 4,794,043 | 12/1988 | Kaji et al. | 429/44 X |
| 5,472,799 | 12/1995 | Watanabe | 429/30 |

*Primary Examiner*—Stephen Kalafut
*Attorney, Agent, or Firm*—Klauber & Jackson

[57] ABSTRACT

Disclosed herein are electrode composition material for a polymer electrolyte fuel cell and a process of preparing same. The electrode composition material includes agglomerates composed of catalyst-loading particles coated with or not coated with ion exchange resin having two particle distribution peaks. The electrode composition material having the two particle distribution peaks supplements the drawbacks of excessively fine particles and of excessively coarse particles and can obtain the excellent cell performance.

2 Claims, 1 Drawing Sheet

5,766,788

ELECTRODE COMPOSITION MATERIAL FOR POLYMER ELECTROLYTE FUEL CELL AND PROCESS OF PREPARING SAME

BACKGROUND OF THE INVENTION

The present invention relates to electrode composition material for a polymer electrolyte fuel cell and a process of preparing same, and more especially to the electrode composition material for the polymer electrolyte fuel cell which enables to elevate cell performances by employing agglomerates of catalyst particles which possess certain distribution.

Since a fuel cell is a high efficiency and non-pollution electric source employing hydrogen and various fossel fuels, it is attracting much more social expectation of a "post-atomic energy" electric source which is applicable to energy problem and global pollution problems. Various fuel cells have been developed for such as an alternative of thermal power generation, on-site generation of a building and a factor and generation in space. Recently, it has been recognized that a green house effect mainly caused by a carbonic acid gas, and acid rain caused by NOx and SOx is serious environmental pollution threatening our future. Since one main discharge source of these pollution gases is an internal combustion engine of an automobile and the like, a trend of utilizing a fuel cell as a motor electric source operated in place of the internal combustion engine loaded on the automobile has been rapidly increased. In this case, the fuel cell and its various incidental facilities are desirably as small as possible, so that it is necessary that the cell performance is high power density. As one candidate of fuel cell satisfying these requirements, a polymer electrolyte fuel cell (hereinafter referred to a PEFC) employing a polymer electrolyte membrane (hereinafter referred to as PEM) is attracting attention.

The PEFC is formed by PEM and an anode and a cathode located on both surfaces of PEM which are joint together by means of hotpressing or the like. The anode and the cathode are composed of a porous catalyst layer and an electroconductive support layer such as carbon paper, and a reaction takes place on the catalyst surface. The catalyst layer may be formed by assembling agglomerates of component particles such as simple catalyst particles or catalyst particles loaded on supports such as carbon black and coating the agglomerates with ion exchange resin.

One requirement necessary for the fuel cell electrode is to output a current at a high current density. While a conventional fuel cell such as a phosphoric acid fuel cell is operated at 150 to 250 mA/cm², PEFC is required to be operated at a high current density of about 10 times, the operating level of a phosphoric acid fuel cell.

Various improvements such as the improvement of a catalyst component, a method of loading the catalyst component, and the protection and the stabilization of the loaded catalyst by means of coating the catalyst with ion exchange resin for enabling an operation at a high current density and for conducting stable operation for a long period of time have been proposed.

However, detailed investigations regarding particle distributions of the agglomerates of the catalyst particles coated with the ion exchange resin and of the agglomerates of the catalyst particles have not conventionally been discussed, and an influence on the electrode activities or the like has not been reported.

When the porous catalyst layer is formed by employing the catalyst particles, it is desirable that the gas permeability is high and the coating rate of the catalyst particles with the ion exchange resin is high, and the catalyst particles have a large influence in this aspect. However, the control of the particle size of the agglomerates of the support particles by means of pulverizing the carbon black or the like has not been investigated.

The present inventors have been carefully examined about this aspect and investigated the particle distribution of the agglomerates of the catalyst particles to find out novel knowledge on the particle distribution.

SUMMARY OF THE INVENTION

An object of the present invention is to provide electrode composition material which can elevate the cell performances.

Another object of the present invention is to provide the electrode composition material having certain particle distribution.

The present invention is electrode composition material for a polymer electrolyte fuel cell comprising agglomerates of catalyst particles prepared by loading catalyst metals on carbon particles such that the particles have a particle distribution containing two particle size peaks. The agglomerates may be coated with ion exchange resin.

The electrode composition material having the agglomerates coated with ion exchange resin can be prepared by pulverizing agglomerates of catalyst particles prepared by loading catalyst metals on carbon particles by means of a pulverizer so that the particle distribution of the agglomerates possesses two particle size peaks, mixing that pulverized agglomerates and ion exchange resin suspended in a solvent and evaporating the solvent to coat the agglomerates with the ion exchange resin.

Different from the conventional knowledge, the pore volume of the electrode employing sufficiently pulverized agglomerates become smaller so as to block the supply of a reaction gas and the discharge of surplus water which are important factors for the elevation of the fuel cell activities.

If, on the other hand, the pulverization is insufficient, the utility of the catalyst is lowered, because the particle size of the agglomerates becomes larger so that the number of the catalysts which are coated with the ion exchange resin decreases.

As mentioned, in the electrode composition material in accordance with the present invention in which the agglomerates have the two particle distribution peaks, the above important factors supplement with each other to obtain high performance which has not been obtained in a conventional fuel cell.

The agglomerates of the catalyst-loading particles having the two particle distribution peaks can be obtained by pulverizing material by means of a planetary ball mill or an ultrasonic homogenizer.

The agglomerates can be also obtained by mixing the two types of particles having the different distribution peaks pulverized in different pulverizing steps.

DETAILED DESCRIPTION OF THE INVENTION

Figure 1:
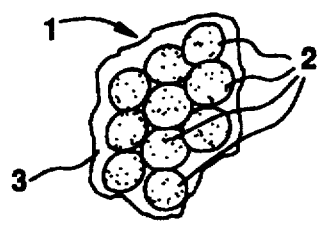
FIG. 1 is a schematic enlarged view showing an agglomerate coated with ion exchange resin employable in electrode composition material in accordance with the present invention.

As mentioned, investigation has not been made on the particle distribution of the agglomerates of the catalyst particles. The present inventors have prepared various agglomerates of the catalyst particles having various particle distributions, and have investigated the influences of the particle distribution of the agglomerates of the catalyst particles on the cell performances by measuring the cell performances.

As a result, if the particle size of the agglomerates is too small or the pulverization is excessively conducted, the pore volume is decreased, so that the supply of a reaction gas and the discharge of surplus water are not performed smoothly, and the fuel cell performances are deteriorated and the amount of the output energy is decreased.

On the other hand, as recognized in the conventional knowledge, if the particle size of the agglomerates is excessively large, the catalyst particles coated with the ion exchange resin is decreased so that the utility of the catalyst is decreased and the cell performances are deteriorated.

If the catalyst particles are finely pulverized as much as possible, the particle distribution becomes narrow distribution having a single peak. If, on the other hand, the pulverization is insufficient, the agglomerates having relatively wide particle distribution with a single peak can be obtained. When these catalyst particles are employed as the electrode composition material for a fuel cell, the elevation of the activities is scarcely observed.

The present inventors have conducted the pulverization of the agglomerates of the catalyst particles with a planetary ball mill or an ultrasonic homogenizer so that the particle distribution of the agglomerates of the catalyst particles acquires two particle size peaks. The planetary ball mill is an apparatus conducting pulverization while a ball mill pot rotates on its axis or revolves around.

These particles may be prepared by mixing the two types of particles having the different distribution peaks pulverized in different pulverizing steps.

The 100% reproduction of the agglomerates having the two particle size peaks can be realized by suitably adjusting the pulverizing force and the pulverizing time.

The agglomerates after the pulverization possess the two kinds of the particle distributions and the two distributions supplement with each other for overcoming the drawbacks of the decrease of the pore volume when the particle size is excessively small and regarding the decrease of the catalyst utility when the particle size is excessively large. The high performances which have not been observed in a conventional fuel cell can be obtained by harmonizing the two distributions.

The above certain distributions means, for example, that there are one particle distribution peak between 0.1 and 1.0 µm and another between 1.0 and 10 µm, and the particle occupying the distribution between 0.1 and 10 µm is around 25% preferably between 20 and 30% of the total volume.

The catalyst employable in the present invention includes simple platinum and known platinum alloys.

The agglomerates of the catalyst particles pulverized to have the two particle size distribution peaks are coated with ion exchange resin by means of, for example, a spray dry method, and are converted into catalyst layers which function as an anode or a cathode by transferring the suspension of the particles with a solvent or its paste to carbon paper or the like. The two catalyst layers and PEM inserted therebetween are piled and integrated by means of hotpressing or the like to provide a fuel cell.

The agglomerate coated with the ion exchange resin in accordance with the present invention is illustrated in FIG. 1.

An agglomerate 1 is composed of a plurality of catalyst particles 2, and the agglomerate 1 is coated with ion exchange resin 3. A catalyst layer of a fuel cell can be formed by the agglomerates 1 coated with the ion exchange resin 3.

EXAMPLES

Although Examples of the preparation of the electrode composition material for a polymer electrolyte fuel cell in accordance with the present invention will be illustrated, these are not construed to restrict the invention.

Example 1

After carbon black was impregnated wit a chloroplatinic acid aqueous solution (platinum concentration 5 g/liter), a platinum-carbon catalyst of which a platinum loading amount was 30% in weight was prepared by thermal decomposition treatment.

Figure 2:
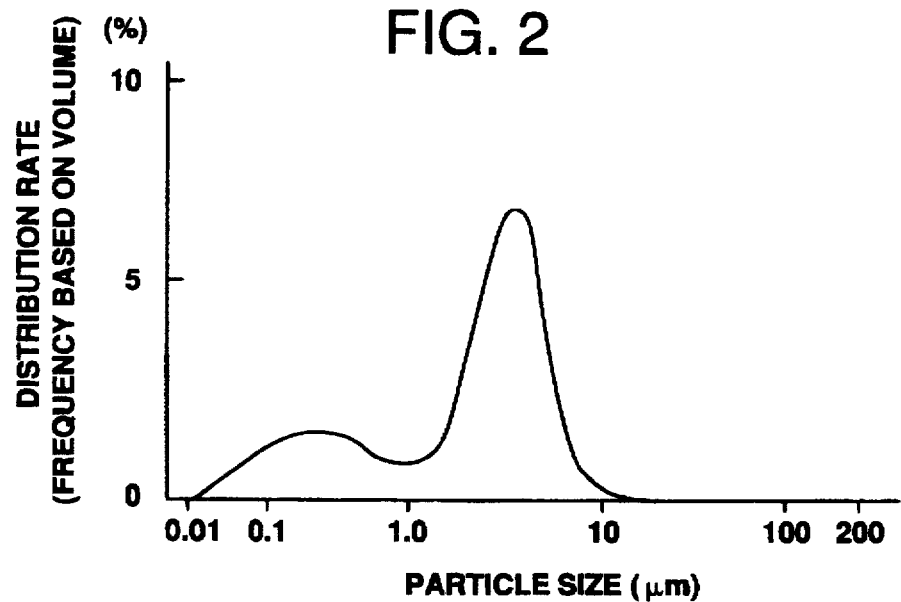
FIG. 2 is a graph showing particle distribution of agglomerates of a platinum-carbon catalyst having two peaks in Example 1.

The platinum-carbon catalyst was pulverized for 40 minutes by a planetary ball mill which was made of zirconia. The particle distribution of the pulverized carbon black was measured, and the distribution was as shown in FIG. 2 having one peak between 0.1 and 1.0 µm of which a corresponding volume was 25% of the total volume and the other peak between 1.0 and 10 µm of which a corresponding volume was remaining 75%.

The pulverized carbon catalyst was impregnated in a certain volume of a commercially dispersed solution of ion exchange resin [NAFION (trademark), Aldrich Chemical, Inc.] so that the weight ratio between the carbon black in the carbon catalyst and ion exchange resin became 1:1. After it was suspended by adding 2-propanol and the solid rate was adjusted to 10 mg/ml, the carbon catalyst was coated with Nafion by spray-drying the suspension.

Then, the carbon catalyst coated with Nafion was added to ethanol, and it was dispersed for two minutes with an ultrasonic homogenizer. After this dispersion was filtered under weak suction, it was transferred on carbon paper functioning as a current collector. An electrode was prepared by the hotpressing for three seconds at a pressure of 5 kg/cm$^2$ and a temperature of 130° C. The pore volume having a diameter under 1 µm existing in the electrode (porous catalyst layer) was measured with a mercury porosimeter to 2.8 cc/g.

A fuel cell having a sandwich structure in which an ion exchange membrane was inserted between the electrodes was obtained by inserting a Nafion 115 (trademark of Du Pont, ion exchange resin) membrane having a thickness of 150 µm between the two electrodes.

COMPARATIVE EXAMPLE 1

A fuel cell was prepared through the same procedures as those of Example 1 except that the pulverization was continued for 60 minutes.

Figure 3:
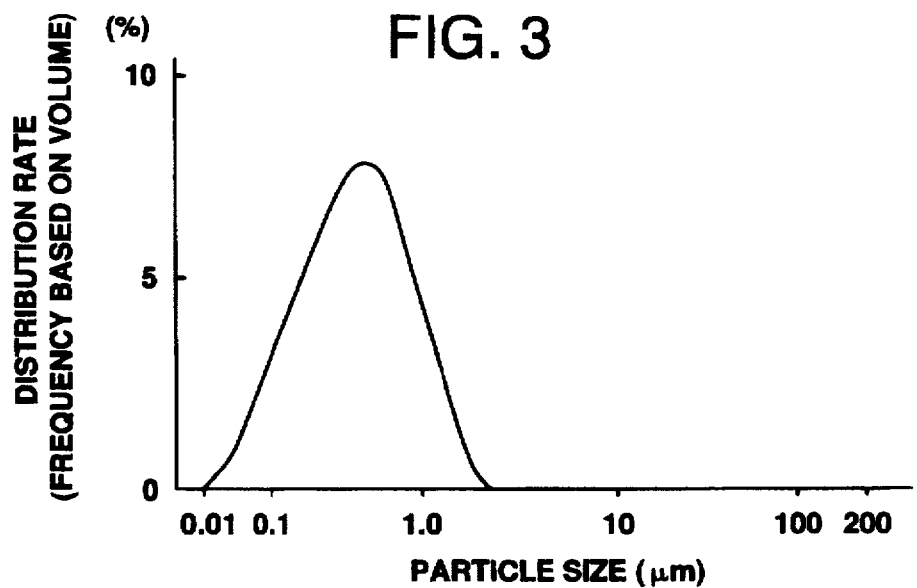
FIG. 3 is a graph showing particle distribution of agglomerates of a platinum-carbon catalyst having a single peak in Comparative Example 1.

The particle distribution of the agglomerates of the platinum-carbon catalyst after the pulverization by means of the ball mill in Comparative Example 1 was a single peak as shown in FIG. 3. The electrode was prepared in accordance with the procedures of Example 1. The pore volume having an diameter under 1 µm existing in the electrode was 0.3 cc/g.

For evaluating the performances of the both fuel cells in Example 1 and Comparative Example 1, current densities (mA/cm$^2$, IR-free) at 0.7V and 0.5V, and a concentration overvoltage at 1.5 A/cm$^2$ were measured under the following conditions. The supply gases to an anode and a cathode were hydrogen and oxygen at 1 atm., respectively. The flow rate were 300 ml/min. and 350 ml/min. The cell temperatures were 60° and 80° C. The results are shown in Example 1.

TABLE 1

|  | Pore Volume Below 1 μm (cc/g-carbon black) | Cell Temperature 60° C. | | | Cell Temperature 80° C. | | |
| --- | --- | --- | --- | --- | --- | --- | --- |
|  |  | Current Density at 0.7 V | Current Density at 0.5 V | Concentration Overvoltage at 1.5 A/cm² | Current Density at 0.7 V | Current Density at 0.5 V | Concentration Overvoltage at 1.5 A/cm² |
| Example 1 | 2.6 | 1610 mA/cm² | 2320 mA/cm² | 60 mV | 1700 mA/cm² | 2850 mA/cm² | 50 mV |
| Comp. Example 1 | 0.3 | 1220 mA/cm² | 2070 mA/cm² | 110 mV | 1170 mA/cm² | 2320 mA/cm² | 110 mV |

What is claimed is:

1. An electrode composition material for a polymer electrolyte fuel cell containing agglomerates of catalyst particles prepared by loading catalyst metals on carbon particles, said agglomerates having a particle size distribution with a particle size peak between 0.1 and 1.0 μm. and a second particle size peak between 1.0 and 10 μm.

2. An electrode composition material for a polymer electrolyte fuel cell containing agglomerates of catalyst particles prepared by loading catalyst metals on carbon particles, the surface of the agglomerates containing a coating of an ion exchange resin, said agglomerates having a particle size distribution with a particle size peak between 0.1 and 1.0 μm. and a second particle size peak between about 1.0 and 10 μm.

* * * * *

UNITED STATES PATENT AND TRADEMARK OFFICE
CERTIFICATE OF CORRECTION

PATENT NO. : 5,766,788
DATED : June 16, 1998
INVENTOR(S) : M. Inoue and T. Tada

It is certified that error appears in the above-indentified patent and that said Letters Patent is hereby corrected as shown below:

Column 6, line 18, delete the word "about"

Signed and Sealed this

Tenth Day of November 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,766,788
DATED : Masahiko Inoue, e t. al.
INVENTOR(S) : June 16, 1998

It is certified that error appears in the above-identified patent and that said Letters Patent is hereby corrected as shown below:

On the title page, Item [73], should read --Tanaka Kikinzoku Kogyo K.K., Tokyo, Japan; Masahiro Watanabe, Yamanshi, Japan; Stonehart Associates, Inc., Madison, Connecticut--

Signed and Sealed this

Twenty-seventh Day of July, 1999

Attest:

Q. TODD DICKINSON

Attesting Officer

Acting Commissioner of Patents and Trademarks